April 21, 1953     W. P. OEHLER ET AL     2,635,404

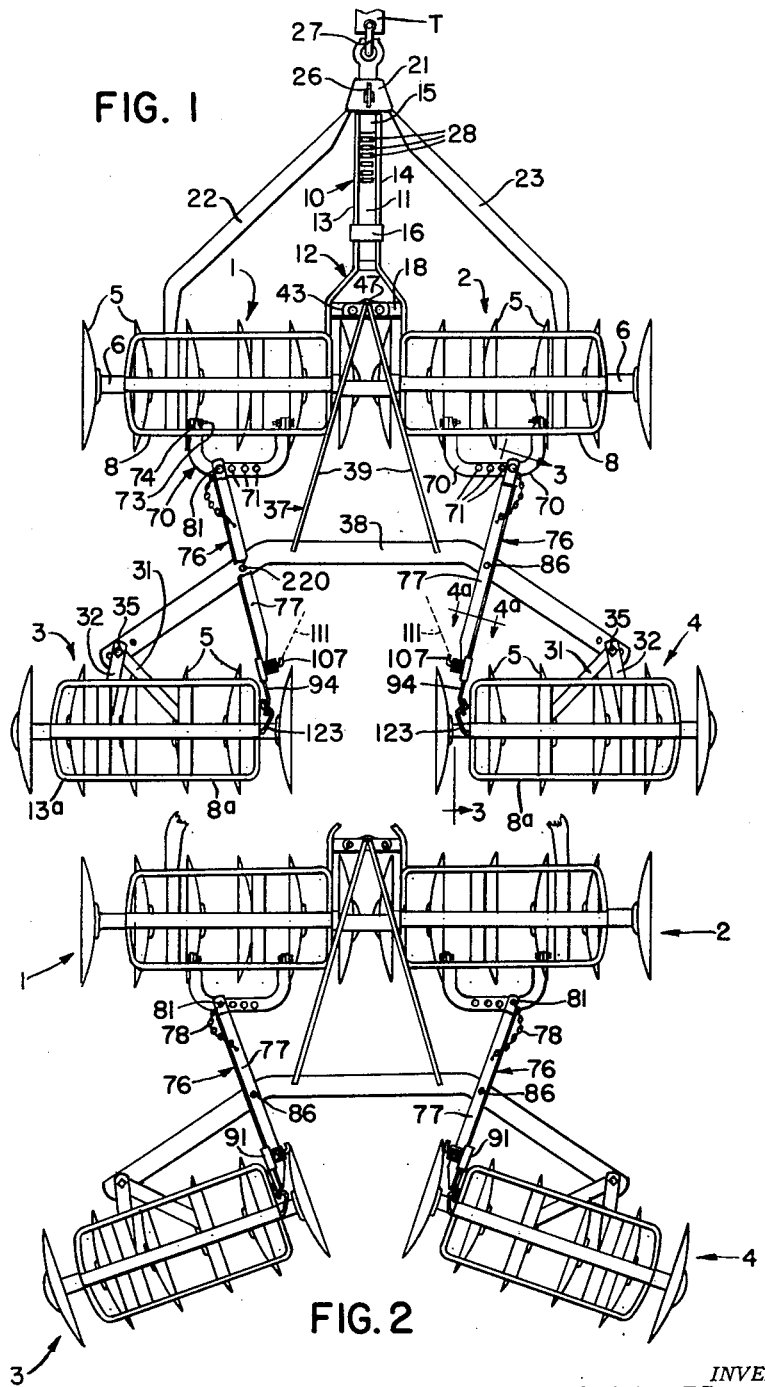

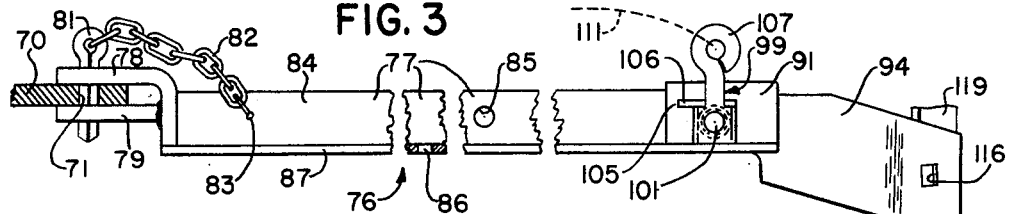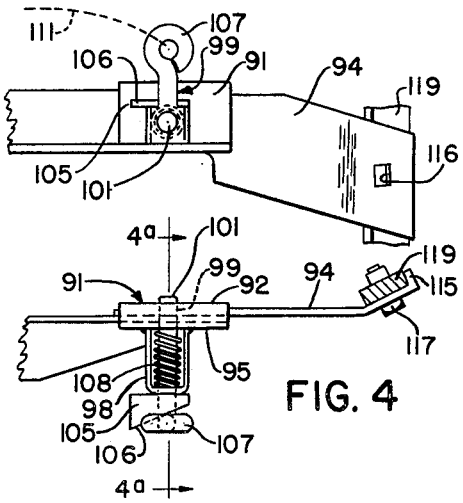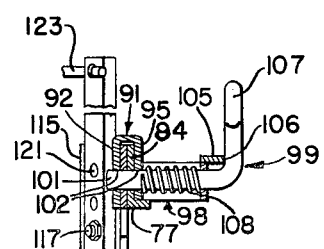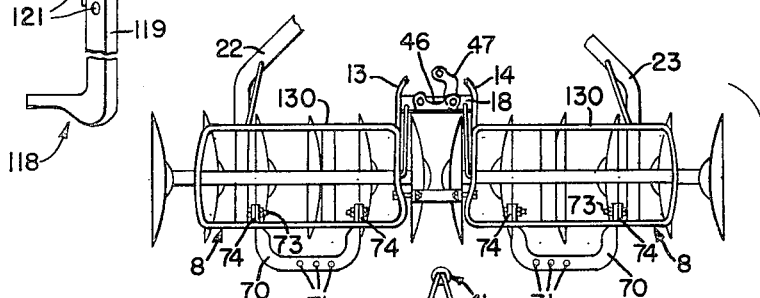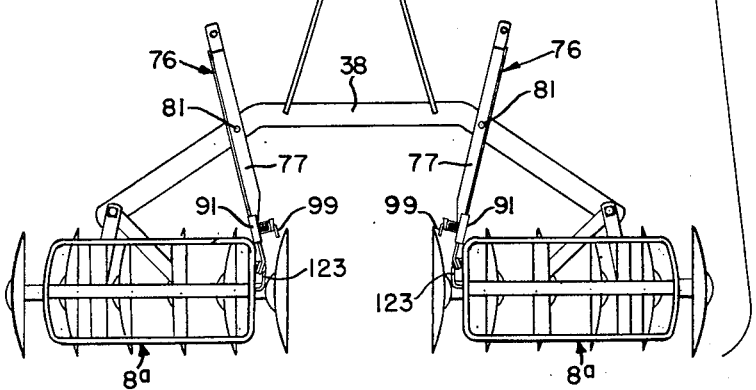

DISK HARROW

Filed Sept. 15, 1947     4 Sheets-Sheet 3

*INVENTORS*
WILLIAM P. OEHLER
CHARLES H. YOUNGBERG
BY

ATTORNEYS

April 21, 1953 W. P. OEHLER ET AL 2,635,404
DISK HARROW
Filed Sept. 15, 1947 4 Sheets-Sheet 4
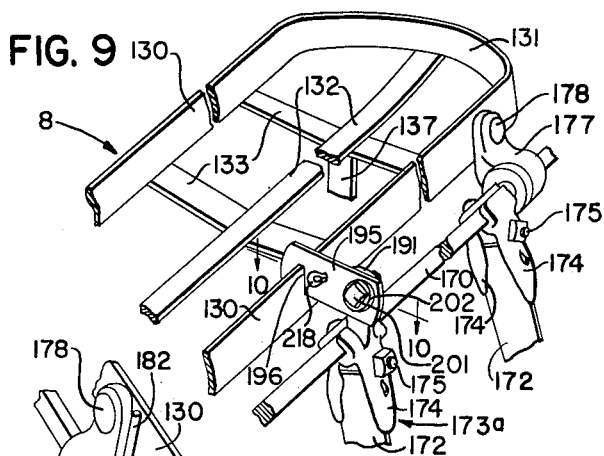
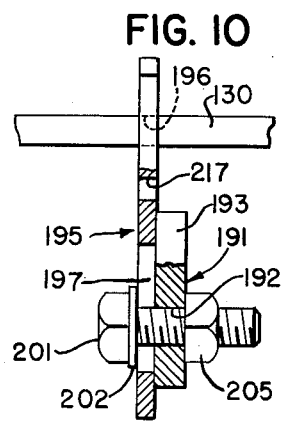
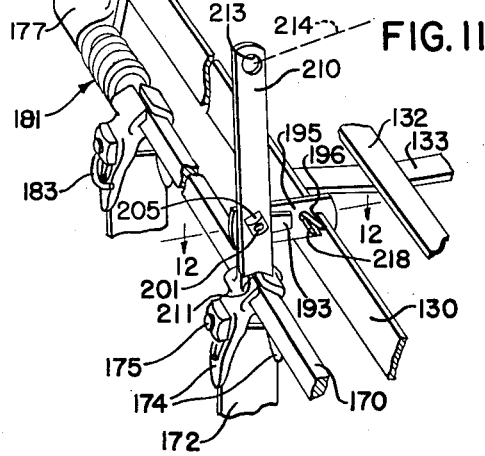
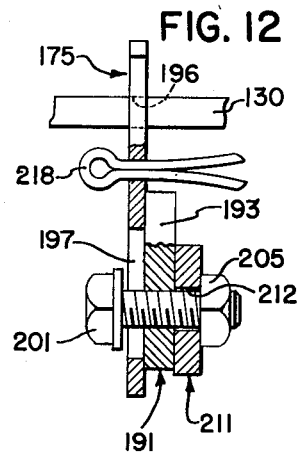
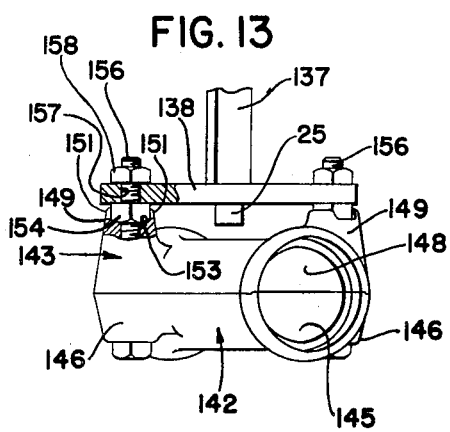
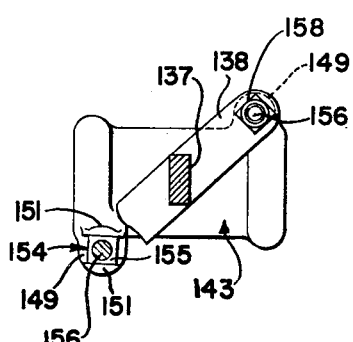
INVENTORS
WILLIAM P. OEHLER
CHARLES H. YOUNGBERG
BY
ATTORNEYS Patented Apr. 21, 1953

2,635,404

UNITED STATES PATENT OFFICE 2,635,404

DISK HARROW

William P. Oehler and Charles H. Youngberg, Moline, Ill., assignors to Deere & Company, Moline, Ill., a corporation of Illinois Application September 15, 1947, Serial No. 774,040

10 Claims. (Cl. 55—83)

The present invention relates generally to agricultural implements and more particularly to soil working implements, such as disk harrows and the like.

The object and general nature of the present invention is the provision of a disk harrow of the double action or tandem type having new and simplified frame construction. A further feature of this invention is the provision of a new and improved control for the disk scrapers, wherein the scrapers may optionally be set for operating in a given position or may be arranged for manual oscillation, as desired.

A further feature of this invention is the provision of new and improved means for controlling the position of the rear gangs relative to the front gangs, whereby the latter gangs may be left in straightened position while the rear gangs may, if desired, be swung into their operating position, as for throwing up beds and the like. Further, an object of this invention is the provision of means for controlling the rear gangs relative to the front gangs by means accessible to the operator on the tractor.

An additional feature of this invention is the provision of a new and simplified disk harrow construction whereby the same may be separated into front and rear sections and the sections easily and quickly arranged for storage in a small space, and further, it is a particular feature of this invention to provide means whereby the gangs, when so separated, may readily and easily be handled for storage.

Still further, another feature of this invention is the provision of a new and simplified bearing construction especially adapted to be produced at low cost and so constructed and arranged to receive the gang frame standard and support the same in a firm and rigid manner.

These and other objects and advantages of the present invention will be apparent to those skilled in the art after a consideration of the following detailed description, taken in conjunction with the accompanying drawings, in which:

Figure 1 is a plan view of a tandem or double action disk harrow in which the principles of the present invention have been incorporated.

Figure 2 is a view similar to Figure 1, showing the rear gangs arranged for throwing up beds and the like while the front gangs are maintained in a straightened or non-working position.

Figure 3 is a detailed view of the rear gang controlling linkage.

Figure 4 is a fragmentary view of the spring thrust plunger and associated parts of the rear gang control linkage.

Figure 4a is a view taken along the line 4a—4a of Figure 4.

Figure 5 is a view similar to Figure 1, but showing the rear gangs and rear gang frame separated from the front gangs and hitch frame, preparatory to arranging the units for storage.

Figure 9 is an enlarged fragmentary perspective view of the means for holding the scrapers in the desired position of adjustment.

Figure 10 is a sectional view, taken generally along the line 10—10 of Figure 9.

Figure 11 is an enlarged fragmentary perspective view showing the scraper control means equipped optionally with a lever for changing the position of the scrapers, when desired.

Figure 12 is a sectional view taken generally along the line 12—12 of Figure 11.

Figures 13 and 14 are detail views of a new and simplified bearing construction, especially adapted for disk harrows and the like.

Figure 6:
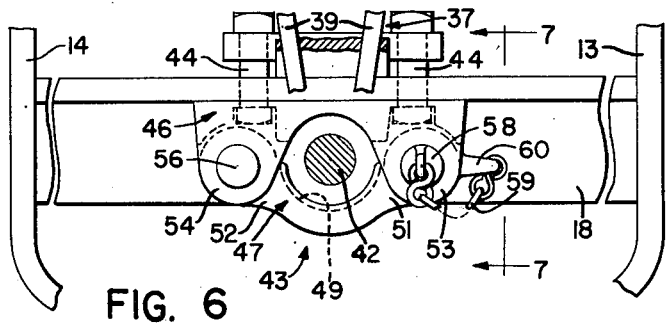
Figure 6 is an enlarged fragmentary plan view of the quick release ball and socket connection between the front and rear frames.

Referring now to the drawings, particularly Figure 1, the disk harrow shown by way of illustration comprises a pair of front gangs 1 and 2 and a pair of rear gangs 3 and 4. Each gang includes a plurality of ground working disks 5 with spacing spools 6 disposed therebetween, all mounted on a gang bolt in accordance with conventional construction. Certain of the spacing spools 6 are formed or arranged so as to serve as bearing means for receiving and supporting the gang standards of a scraper frame 8 that is carried by each of the front and rear gangs.

A hitch structure, by which the harrow is connected to a propelling tractor or the like, comprises a front frame 10 that is made up of a front draft receiving channel member 11 slidable within a drawbar section 12. The latter comprises a pair of strap members 13 and 14 connected together at the front ends by one or more cross plates 15 between which the rear end of the channel member 11 is received. A stop 16 is secured to the rear end of the channel member 11 and engages the stop plate 15 on the rear frame member 12 for limiting the forward movement of the channel member 11 relative thereto. The rear ends of the frame members 13 and 14 diverge laterally outwardly and are interconnected by means of a tie angle 18, the ends of which are secured, as by welding, to the rear portions of the frame bars 13 and 14. The rear ends of said frame bar portions are bent downwardly, flattened and apertured to receive studs carried by the innermost bearings of the two front gangs 1 and 2, as will be referred to later in detail in connection with our improved disk harrow bearing.

Mounted on the channel member 11 is a front slide box 21 to which the forward ends of a pair of draft links 22 and 23 are pivotally connected, and the rear ends of the draft links 22 and 23 are pivotally connected to the laterally outer gang bearings, preferably by apertured extensions 24 secured to the rear ends of the draft links 22 and 23 and pivotally connected to studs 25 carried by the bearings. In this way, the rear ends of the draft links 22 and 23 are connected to the outer bearings of the front disk gangs in substantially the same way as the rear ends of the frame members 13 and 14 are pivotally connected to the laterally inner bearings, to which detailed reference will be made below. The hitch structure just described is such that by means of a latch 26 the slide 21 may be connected to the channel member 11 whereby, when the tractor to which the harrow is connected, as at 27, is driven forwardly, the channel 11 moves forwardly with respect to the drawbar frame section 12 until the stop 16 engages the plate 15, this movement carrying with it the slide 21 and the draft links 22 and 23, whereby the forward ends of the front gangs 1 and 2 are swung forwardly into an angled or working position. It will be understood that before the slide 21 is connected with the channel member 11, the latter is shifted rearwardly to permit the latch 26 to be engaged with one of the forwardmost openings 28 in the channel 11. Thereafter, if it should be desired to shift the gangs 1 and 2 into a straightened or transport position, all that it is necessary to do is to release the latch 26, which permits the gangs to drop back into their transport position, the slide 21 shifting rearwardly along the channel 11 until it engages the front side of the drawbar frame plate 15, or the tractor may be backed to force the gangs into a straightened position, this being the position shown in Figure 1.

Figure 7:
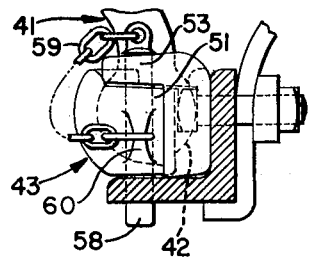
Figure 7 is a sectional view taken generally along the line 7—7 of Figure 6.

The laterally outer portion of each of the rear gangs 3 and 4 carries a plurality of pivot braces 31, 32 and 33 which at their rear ends are connected with the outer portion of the associated gang, the rear ends of the bars 31 and 32 being connected to the scraper frame 8a while the rear end of the lower pivot brace or bar 33 is connected with the outer bearing of the gang. The pivot braces 31, 32 and 33 converge forwardly and carry a pivot bolt 35. The other rear gang 4 is provided with similar pivot braces, and the two pivot members 35 are connected with the laterally outer ends of a rear frame 37 that is made up of a generally laterally extending angle 38, and two gooseneck straps 39 that extend forwardly in converging relation and have forward downwardly extending portions welded to a member 41 the lower portion of which is formed as a ball 42. The latter section is received in a bearing 43 (Figures 6 and 7) mounted on the tie angle 18 by any suitable means, such as bolts 44. The bearing 43 is made up of two sections 46 and 47, the section 46 having sockets to receive the heads of the bolts 44 and a central semi-spherical socket section 49 to receive the ball 42 on the rear frame 37. The forward bearing section 47 is provided with a pair of apertured ears 51 and 52 which are adapted to be disposed between similar apertured ears 53 and 54 formed on the bearing member 46. At one side of the bearing 43 a pin 56 pivotally interconnects the two bearing sections 46 and 47, and at the other side a quick detachable pin 58, which may be in the form of a cotter, is disposed in the apertured ears and connected by a chain 59 to an apertured lug 60 on the bearing section 47. The bearing 43 may thus be readily and quickly separated, merely by taking out the quick removable pin 58, thus immediately separating the front and rear frames 10 and 37. Reference to the separation of the front gangs from the rear gangs for purposes of storage will be made later.

The linkage connecting the front gangs with the rear gangs, by which the angling and deangling of the front gangs, as described earlier, automatically effect the angling and deangling of the rear gangs will now be described. Secured to the laterally inner portion of each front scraper frame 8 is a bracket 70. Each bracket 70 comprises a generally U-shaped bar, having a plurality of apertures 71 formed in the central or bail section thereof, the front ends of each bracket 70 being pivotally connected, as at 73, to lugs 74, secured, as by welding or the like, to the rear bar of the scraper frame 8. An angling link 76 serves to connect each front gang with the laterally inner end of the associated rear gang, such draft link being best shown in Figure 3. Referring now to this figure, it will be noted that each draft link 76 comprises a main link member 77, preferably in the form of an angle, carrying a pair of apertured lugs 78 and 79 which are spaced apart so as to receive therebetween the associated bracket 70. The lugs 78 and 79 are apertured, and a quick detachable pin 81 is disposed in the apertures in the lugs 78 and 79 and a selected one of the openings 71 in the associated bracket 70. A chain 82 permanently connects the quick detachable pin 81 with the angle, the rear end of the chain being connected, as by a cotter 83, to a vertical flange 84 of the angle member 77. The vertical flange 84 is also provided with a plurality, at least two, of openings 85, and also an opening 86 in the horizontal flange 87. The rear end of the vertical flange 84 of the angle member 77 is disposed between a U-shaped yoke 91, one side 92 of which is welded to the front portion of an adjusting plate 94. The other side 95 of the U-shaped yoke section 91 carries a plunger bracket 98, and a plunger 99 is carried by the bracket 98 and has an end 101 disposed through openings 102 in the yoke 91. A cam plate 105 is secured, by welding, to the plunger bracket 98 and has a cam throwout face 106 that cooperates with the handle section 107 of the plunger 99. A spring 108 is confined between the outer end of the bracket 98 and a cotter 109 carried by the plunger 99. The inner end 101 of the plunger 99 is adapted to extend through either of the openings 85 in the vertical flange 84 of the link member 77 for locking the two link sections 77 and 94 together in adjusted relation. The outer or upper end of the handle section 107 is formed to receive a rope or other control element 111 whereby a forward pull exerted through the element 111 will swing the handle section 107 forwardly which, being moved laterally outwardly by the cam throwout face 106, withdraws the end 101 from the opening 85 in the vertical flange 84 of the link member 77, thus freeing one of the link members 77 and 94 for movement relative to the other. The spring 108 is arranged so that when the pull on the element 111 is released, the arm 107 swings rearwardly, thus permitting the spring 108 to force the inner end 101 into one of the openings 85 in the vertical flange 84. The rear edge of the plate member 94 is bent laterally, as at 115, and is apertured, as at 116, to receive a bolt 117 or the like which fastens the rear portion of the member 94 to a rear gang leveling bracket 118, the latter including a vertically upwardly extending section 119 that is apertured, as at 121, to receive the bolt 117 in different vertical positions. The lower end of the leveling bracket 118 is pivotally connected to the laterally inner bearing of the associated rear gang, and the upper portion of the bracket extension 119 is connected by a link 123 to the adjacent portion of the associated scraper frame 8a, whereby the latter is stabilized. The member 94 may be fixed to the associated bracket 118 in different positions, as desired, for holding the inner end of the associated rear gang against downward displacement, the link 76 overlying the associated portion of the rear frame bar 38 so as to resist any tendency for the inner end of the rear gang to run too deep. Thus, the inner end of each rear gang may be leveled by fixing the plate 94 to the bracket 118 in the proper position.

Except for the lugs 74, the gang frames 8 and 8a are substantially identical, and as best shown in Figure 9, each gang frame, sometimes referred to as a scraper frame, comprises a bar 130 formed into generally rectangular configuration with rounded end portions 131. A reenforcing bar 132 connects the inner and outer ends of each frame and cross bars 133 connect the front and rear side sections of the frame. At the laterally outer end of each of the scraper frames 8 and 8a, the adjacent cross bar 133 is welded to the upper end of a gang frame standard 137, and a similar standard is welded at its upper end to the inner end of the frame. The lower end of each standard 137 has a foot piece 138 welded thereto in generally diagonal relation, and projecting below the lower side of the foot piece 138 is a pivot lug 25 which forms a part by which draft is transmitted to the gang through the associated disk bearing, referred to in detail below.

As best shown in Figures 13 and 14, the standard-supporting bearing, all of such bearings in the disk harrow being preferably identical, comprises a lower bearing half 142 and an upper bearing half 143. The lower bearing half includes a bearing-receiving socket 145 and two apertured lugs 146. The upper bearing half 143 is of similar configuration, including a bearing socket 148 and a pair of apertured lugs 149. As best shown in Figure 14, the lugs 146 and 149 are disposed in diagonal relation, that is, the lugs at one side of the bearing are adjacent one end thereof while the lugs at the other side of the bearing are at the other side thereof, and the upper bearing half 143 is provided with small lugs or abutments 151 adjacent the bolt-receiving aperture that extends through each of the aforesaid lugs. Likewise, the lugs 146 on the lower bearing half are also provided with bolt-receiving apertures. At the upper side of the upper bearing half, and surrounding the bolt openings therein, each of the lugs is provided with a concave socket section 153 shaped to receive the convex portion of a standard square nut 154 the upper face 155 of which is substantially flat, as in conventional practice. The lugs 151 on the upper face of the upper bearing member 143 are disposed so as to form stops for the nuts 154 and also to hold the latter in the position shown in Figure 14, namely, in such a position that the greatest dimension of the upper flat face 155 extends generally perpendicular to a line joining the bolts 156 that fasten the two bearing halves 142 and 143 together. Each of the bolts 156 is threaded for a considerable distance so that the threaded end of each of the bolts may extend upwardly from the nut 154 and through apertures 157 in the foot section 138 of the gang frame standard 137. A lock nut 158 is screwed onto the upper threaded portion of each bolt 156 for firmly fixing the foot piece 138 to the gang bearing, and since the nuts 154 are held in their diagonal position by the lugs 151, the foot section 138 has ample lateral stability when clamped tightly against the flat faces 155 of the bearing nuts 154 when the lock nuts 155 are tightened. The diagonal disposition of the bearing bolts 156, together with the shape of the upper bearing half 143 and the thickness of the bearing nuts 154, provide ample space for the apertured end of the associated draft transmitting part, either the draft link extension 24, in the case of the outer ends of the front gangs, or the bars or brackets associated with the standard-receiving bearings carried by the inner ends of the front gangs and the inner and outer ends of the rear gangs.

As best shown in Figures 9 and 11, oscillatable scraper shafts 170 are mounted for rocking movement on the rear portions of the front and rear gang frames 8 and 8a. Each scraper shaft 170 preferably comprises a square member carrying a plurality of scraper blades 172, one for each disk. Each of the scraper blades 172 is mounted in a mating pair of scraper clamps 174, each having a blade receiving section and a shaft receiving section and firmly clamped to the companion member by a clamping bolt 175. Each of the scraper shafts is mounted in a pair of brackets 177 secured to the rear side of the gang frame, each shaft 170 being supported in the bracket 177 by suitable bushings or the like. Each shaft 170 also carries a torsion spring 181 having one end 182 bearing against an adjacent portion of the frame and the other end 183 bearing against the adjacent scraper blade clamp 173a, whereby the spring 181 serves not only to hold the scraper blades against the faces of the associated disks but also tends to rock the associated shaft 170 in such a direction as to carry the scraper blades radially inwardly of the disks. The brackets 177 preferably are secured by bolts 178 to the associated gang frame but any other suitable means may be employed if desired.

Under some conditions it may be desirable to manually rock the scraper shafts 170 so as to shift the lower ends of the scraper blades 172 radially outwardly, but not beyond the edges of the associated disks, for the purpose of clearing away trash and the like, but under most conditions it is not necessary to oscillate the scraper shafts 170 although it is desirable to be able to dispose the lower ends of the scraper blades 172 in the desired position radially of the associated disks. In order to provide a new and improved scraper controlling linkage to accommodate the above mentioned two conditions, we have provided the following scraper control means.

Referring first to Figure 9, one of the scraper blade clamps, such as the one indicated by the reference numeral 173a in Figure 9, is provided with an upper or arm extension 191 that is provided with a tapped opening 192 and an abutment section 193. A clip or plate 195 is provided with a relatively deep notch 196 dimensioned and angled so that the clip or plate 195 engages over the edge of the rear bar on the associated gang frame. The clip or plate 195 is also provided with a longitudinally extending slot 197. Where it is desired to be able to adjust the position of the scraper blades 172 radially of the disks, but not to oscillate the blades, we provide a bolt 201 and insert the same through the slot 197 and the bolt is screwed into the tapped opening 192 in the scraper arm 191. A washer 202 is placed underneath the head of the bolt 201 on the side of the clip or plate 195 opposite the arm 191. The scraper blades are then moved manually into the desired position while the bolt 201 is loose in the slot 197. Then the bolt 201 is tightened by turning the same farther into the arm 191, thus firmly and rigidly clamping the latter to the plate 195 and thereby holding the arm in a given position relative to the frame 8 or 8a. A lock nut 205 is threaded onto the opposite end of the bolt 201 while retaining the desired adjustment. The scrapers may be readjusted at any time merely by loosening the lock nut 205 and then loosening the bolt 201 in the arm 191 to permit the bolt to be shifted to a new position in the slot 197, whereupon the clutch may then be tightened to retain the new adjustment.

When it is desired to arrange the disk harrow for oscillating the scraper shafts 170 whenever desired, we supply an oscillating lever 210 for each shaft 170. As best shown in Figure 11, each lever 110 is provided at its lower end with a V-shaped notch 211 and an opening 212 to permit the lever to be mounted on the threaded end of the bolt 201. The upper end of each lever 210 has an opening 213 to receive a cable or other element 214 that may extend to the operator's position on the tractor. Where the levers 210 are to be used, and before mounting the levers on the bolts 201, each of the latter is loosened in its associated scraper arm 191 so that the bolt is freed for movement in the associated slot 197. Then with the bolt 201 in its loosened condition, the lever 210 is mounted, as shown in Figure 11, and then the lock nut 205 may be applied for firmly holding the lever 210 against the scraper arm 191. Arranged in this manner, with the springs 181 holding the scraper blades in their forward position, whenever it is desired to move the lower ends of the scraper blades rearwardly, all that the operator has to do is to pull on the cables 214. For the larger disks, the engagemant of the stop members or abutment sections 193 or the arms 191 with the adjacent portion of the scraper frame serves to limit the outward movement of the lower ends of the scraper blades. However, where smaller disks may be used, we provide each of the clips or plates 195 with an opening 217 therein to receive a cotter 218, which is disposed rearwardly of the frame such a distance that when the lever 210 is pulled forwardly, the engagement of the lug 193 with its associated cotter serves to prevent the lower ends of the scraper blades from being swung outwardly beyond the edges off the associated disks.

The operation of the harrow described above is substantially as follows.

Referring first to Figure 1, the harrow may be controlled in the normal or conventional manner by the use of the latch 26. That is, first the drawbar is cocked by first backing the tractor so as to force the channel member 11 rearwardly with respect to the frame 12, with the latch 26 in a released position. The latch 26 is then permitted to connect the slide 21 with the channel 11 and the tractor is driven forwardly. This pulls the outer ends of the front gangs into an angled position while the rear ends drop backwardly with respect thereto, due to the pressure of the soil against the innermost disks. The resulting angling of the front gangs acts through the gang control linkage 76 to permit the rear ends of the inner ends of the rear gangs to drop backwardly, thus causing the rear gangs to go into their working position. At any time that it is desired to return the harrow to a transport or straightened position, the latch 26 is released. This permits the slide 21 to move backwardly against the forward end of the drawbar or frame member 12, which results in the outer ends of the front gangs and the inner ends of the rear gangs dropping backwardly, thus placing the harrow in its non-working position. With the harrow in its straightened position (Figure 1) the operator may angle the rear gangs only, merely by pulling both cables 111 and then backing the tractor, thus forcing the yokes 91 to slide forwardly along the angle members 77 until the plungers 99 can enter the forward openings 85 in the links 77. Then while the front gangs are held in their straightened position, the rear gangs will be held in their angled position whereby the implement may be used for throwing up beds and similar operations. When it is desired to permit the rear gangs to return to their straightened position, all that it is necessary to do is to momentarily release the plungers 99 by pulling on the cables 111 until the inner ends 101 of the plungers are disengaged from the forward openings 85, whereupon the yokes 91 will shift rearwardly until the plungers 99 come into register with the rear openings 85, and if by this time the pull on the cables 111 is released, the springs 108 will immediately cause the plungers 99 to reengage in the rear openings 85, thus locking the two sections of the gang angling links 76 and interlocking the front and rear gangs for movement together into their straightened or angled positions.

Figure 8:
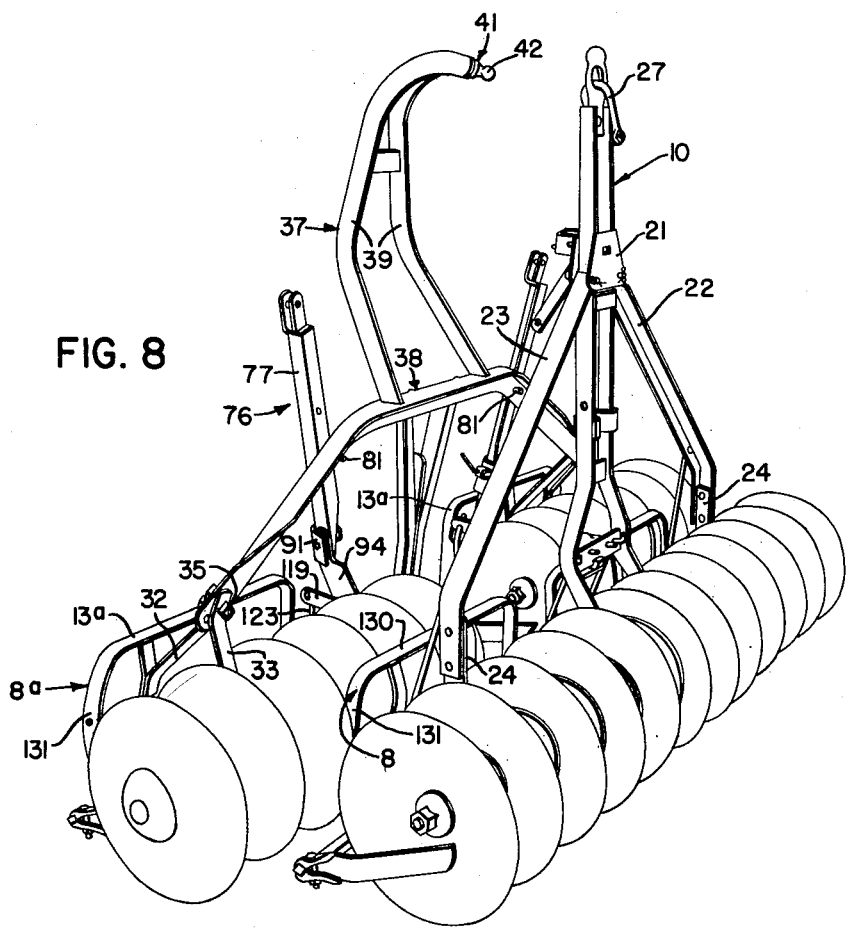
Figure 8 is a perspective view showing the compact manner in which the separated gangs may be stored in a comparatively small space.

Reference was made above to the fact that the front end of each of the gang angling links 76 is connected with the associated bracket 70 on the front gang by a quick detachable pin 81. When it is desired to store the harrow in as small a space as possible, the pins 81 are disconnected from the front ends of the links 76, freeing the latter from their brackets 70, and the parts shifted until the pins 81 may be inserted into the holes 86 and registering openings 220 in the cross bar 38 of the rear frame 37. Then by taking out the quick detachable pin 58 and swinging the bearing section 47 forwardly, the ball 42 at the front end of the rear frame 37 may be removed from its socket in the bearing 43, which entirely disconnects the front and rear halves of the harrow. When the quick detachable pins 81 are placed in the openings 86 and 220, the chains 82 being long enough to permit mounting the pins 81 in the two positions, the rear gangs, separated from the front gangs, may readily be handled by the rear frame 37 and swung upwardly into a position for storage, such as is shown in Figure 8. Similarly, the front gangs may be handled by the front frame 10. Arranged as shown in this figure, the two sets of gangs occupy only a small space and materially facilitate storing the implement, both in the factory for stock piling and in the implement shed for storage on the farm.

While we have shown and described above the preferred structure in which the principles of the present invention have been incorporated, it is to be understood that our invention is not to be limited to the exact details shown and described herein, but that, in fact, widely different means may be employed in the practice of the broader aspects of our invention.

What we claim, therefore, and desire to secure by Letters Patent is:

1. In a disk harrow of the double acting type, a pair of front gangs, a front draft frame connected with the inner ends of said front gangs, draft links connected with the outer ends of said front gangs, adjustable means connecting the forward ends of said draft links with said draft frame, a pair of rear gangs, a rear frame having laterally spaced apart, rigidly interconnected rear portions connected, respectively, with the outer ends of said rear gangs, angling links connecting the inner ends of said rear gangs, with said front gangs, whereby angling of the latter gangs serves also to angle said rear gangs, means for detachably connecting the forward portion of said rear frame with said front draft frame, means for detachably connecting the forward ends of said angling links with said front gangs, and means for connecting said angling links with said rear frame laterally inwardly of the laterally spaced apart, rigidly interconnected frame portions so as to hold both of the rear gangs substantially in their straightened position and rigidly interconnected with said rear frame when said links are disconnected from said front gangs and said rear frame is disconnected from said front frame, whereby said front and rear gangs may be detached from one another and stored separately.

2. In a disk harrow of the double action type, pairs of front and rear gangs, a front draft frame connected with the inner ends of said front gangs, draft links connected at their rear ends with the outer ends of said front gangs, adjustable slide means movable along the front draft frame and pivotally receiving the front ends of said draft links, a rear frame including a rear transverse member and a forwardly disposed extension, means for pivotally connecting the forward end of said extension with the rear portion of said front frame and including a ball and socket joint and a detachable bearing section whereby said frames may readily be separated, means pivotally connecting the outer ends of said rear frame with the outer ends of said rear gangs, angling links connected at their rear ends with the inner ends of said rear gangs, quick detachable means connecting the front ends of said angling links with said front gangs, whereby angling of the latter serves also to angle said rear gangs, and means carried by said rear frame and said angling links for receiving said quick detachable means, which normally connects the front ends of said angling links with said front gangs in such positions relative to the rear frame that the rear gangs are held in a straightened position, said quick detachable means serving thereby to interlock said angling links with said rear frame so that when said frames are separated and said angling links detached, said front and rear gangs, together with the parts associated therewith, respectively, may be handled separately with facility for storage in a more compact form than when the front and rear gangs are connected for operation.

3. The invention set forth in claim 2, further characterized by said quick detachable means comprising apertures in the forward ends of said links and the associated parts of said front gangs and detachable pins insertable into and removable from said apertures, said links and said rear frame also having apertures adapted to receive said pins for locking said angling links to the rear frame for storage and the like when said front and rear gangs are disconnected from one another.

4. A disk harrow comprising front and rear gangs, a front frame connected with the inner ends of said front gangs, means carried by said frame and connected by the outer ends of said front gangs for angling and deangling the latter, a rear frame pivotally connected at its forward end with said front frame and at its rear end with the outer ends of said rear gangs, and angling links connected, respectively, with the inner ends of said rear gangs and said front gangs laterally outwardly of said front frame, each of said angling links comprising a link member connected at its forward end with the associated front gang, a slide mounted on the rear end of said link member and pivotally connected with the inner end of the associated rear gang, and latch means carried by said slide and engageable with openings in the rear portion of said link member for locking the latter in different positions relative to the associated rear gang.

5. In a disk harrow having a front gang and a rear gang, an angle controlling link connecting said gangs, comprising a link member, means pivotally connecting the front end of said link member with the front gang, said link member including a section having a generally vertically disposed flange, said flange having an aperture therethrough, a plate member connected at its rear end with the rear gang and extending generally forwardly, said plate member including a vertically disposed portion adapted to lie alongside the vertical portion of said link member, a generally inverted U-shaped yoke fixed to said plate member and adapted to embrace the vertical flange section of said link member, said yoke having apertures adapted to be aligned with the apertures in the rear end of said link member, the latter member having other apertures adapted also to be aligned with the apertures in said yoke member, and a spring biased plunger carried by said yoke member and adapted to lock said plate member to said link member in different positions.

6. In a disk harrow, an angling bar comprising a forward angle member having a vertical flange, a rear adjusting member adapted to lie alongside the vertical flange of the rear portion of said angle, a yoke carried by one of said members and receiving the other member for generally sliding movement relative thereto, said yoke having apertures therein, registering apertures formed in said flange, said second member being shiftable generally fore and aft along the vertical flange of said first member, a bracket carried by one part of said yoke and overlying the apertures therein, and a spring biased pin mounted for movement in said yoke for holding the other link member in position relative thereto.

7. For use in a disk harrow of the type having relatively movable front and rear gangs, the rear gang including a rear gang leveling bracket having a vertically upwardly extending section, the improvement comprising an angling bar construction adapted to connect said gangs and comprising a forward angle member having a vertical flange, a rear adjusting member having a laterally directed flange at its rear end adapted to engage the rear edge of said vertically upwardly extending section, said rear adjusting member being adapted at its forward portion to lie alongside the vertical flange of the rear portion of said angle, means carried by said rear adjusting member for engaging over the upper edge of said vertical flange for generally sliding movement relatively thereto, said adjusting member having apertures therein, registering apertures formed in said flange to provide for movement of said second member generally fore and aft along the vertical flange of said first member, and means insertable in said apertures for holding said adjusting member in selected position along said forward angle member.

8. In a disk harrow of the double action type, pairs of front and rear gangs, a front draft frame connected with said front gangs, a rear frame including a rear transverse member and a forwardly disposed extension, detachable means for pivotally connecting the forward end of said extension with the rear portion of said front frame whereby said frames may readily be separated, means pivotally connecting the outer ends of said rear frame with the outer ends of said rear gangs, angling links connected at their rear ends with the inner ends of said rear gangs, detachable means connecting the front ends of said angling links with said front gangs, and connection-receiving means carried by said rear transverse frame member and said angling links for interlocking said angling links with said rear frame so that when said frames are separated and said angling links detached, said front and rear gangs, together with the parts associated therewith, respectively, may be handled separately with facility for storage in a more compact form than when the front and rear gangs are connected for operation.

9. In a disk harrow of the double action type, pairs of front and rear gangs, a front draft frame connected with said front gangs, a rear frame including a rear transverse member and a forwardly disposed extension, detachable means for pivotally connecting the forward end of said extension with the rear portion of said front frame whereby said frames may readily be separated, means pivotally connecting the outer ends of said rear frame with the outer ends of said rear gangs, angling links connected at their rear ends with the inner ends of said rear gangs, quick detachable means connecting the front ends of said angling links with said front gangs, and means carried by said rear frame and said angling links for receiving said quick detachable means that normally connects the front ends of said angling links with said front gangs, in such positions relative to the rear frame that the rear gangs are held in a straightened position, said quick detachable means serving thereby to interlock said angling links with said rear frame so that when said frames are separated and said angling links detached, said front and rear gangs, together with the parts associated therewith, respectively, may be handled separately with facility for storage in a more compact form than when the front and rear gangs are connected for operation.

10. A disk harrow comprising front and rear gangs, a front frame connected with the inner ends of said front gangs, means carried by said frame and connected by the outer ends of said front gangs for angling and deangling the latter, a rear frame pivotally connected at its forward end with said front frame and at its rear end with the outer ends of said rear gangs, and angling links connected, respectively, with the inner ends of said rear gangs and said front gangs laterally outwardly of said front frame, each of said angling links comprising a link member connected at its forward end with the associated front gang, a vertical plate member connected to the rear end of each angling link and including a laterally directed, generally vertically extending flange at the rear end of said plate member, a generally vertically extending apertured leveling bracket connected at its upper and lower ends with the associated gang, and means for fixing the rear portion of said plate member to the associated leveling bracket in different vertical positions relative to the latter.

WILLIAM P. OEHLER.
CHARLES H. YOUNGBERG.

References Cited in the file of this patent

UNITED STATES PATENTS

| Number | Name | Date |
| --- | --- | --- |
| 1,621,622 | Brenneis | Mar. 22, 1927 |
| 1,872,108 | Bopf | Aug. 16, 1932 |
| 1,873,307 | Dewend | Aug. 23, 1932 |
| 2,163,818 | White | June 27, 1939 |
| 2,239,948 | Young | Apr. 29, 1941 |
| 2,266,819 | Seaholm | Dec. 23, 1941 |
| 2,331,738 | Seaholm | Oct. 12, 1943 |